May 9, 1950 M. LEEUWIN 2,507,027

RADIO RECEIVER

Filed April 23, 1946 2 Sheets-Sheet 1

MAX LEEUWIN
INVENTOR.

BY E. J. Wenderoth

ATTORNEY.

May 9, 1950 M. LEEUWIN 2,507,027

RADIO RECEIVER

Filed April 23, 1946 2 Sheets-Sheet 2

MAX LEEUWIN
INVENTOR.

BY E. F. Wenderoth

ATTORNEY.

Patented May 9, 1950

2,507,027

UNITED STATES PATENT OFFICE 2,507,027

RADIO RECEIVER

Max Leeuwin, Eindhoven, Netherlands, assignor, by mesne assignments, to Hartford National Bank and Trust Company, Hartford, Conn., as trustee Application April 23, 1946, Serial No. 664,178
In the Netherlands September 2, 1941

Section 1, Public Law 690, August 8, 1946
Patent expires September 2, 1961

6 Claims. (Cl. 116—124.1)

This invention relates to a radio receiver comprising a hinged tuning dial arranged substantially outside the receiver cabinet and capable of rotation about a horizontal axis.

It has been known before to arrange for tuning dials of radio receivers to be hinged to wit in such manner as to be placed for the greater part outside the receiver cabinet. In this case it was, however, necessary either to cause the tuning means to project an image upon the dial from the interior of the receiver cabinet, which was not particularly useful in increasing the accuracy of reading, or to arrange driving members for the dial pointer, for example flexible driving ropes and guide rollers, in the axis of rotation of the hinged dial in such manner as to permit of a pointer constructionally united with the dial to be driven independently of the angular position of the dial. In the latter case it is therefore necessary constructionally to unite important parts of the drive mechanism of the dial pointer with the dial, the arranging possibilities of the tuning dial being thus largely limited.

Constructions in which the above-mentioned drawbacks were experienced are described for example in the British Specifications No. 413,946 and 428,461.

The invention has for its object to provide a dial of particularly simple construction and of convenient shape with the avoidance of the above-mentioned disadvantages, it being aimed at to render the essential parts of the dial drive considerably more independent from the hinged dial itself than has been the case hitherto.

According to the invention, for this purpose the dial is formed substantially by a glass plate whose lower ends are secured each to a separate carrier which is rotatably mounted on the receiver cabinet, said carriers preferably containing the small lamps that serve for the totally-reflecting dial illumination, the guide way of the sliding piece for the dial pointer said sliding piece, which is lineally driven by the dial drive, being arranged inside the receiver cabinet but outside the axis of rotation of the hinged dial and extending by means of an extension piece through a slot of the receiver cabinet and by means thereof moving; the dial pointer arranged outside the cabinet along the dial.

Thus a dial construction formed substantially of glass is obtained and is arranged on the upper side of the receiver cabinet so as to be completely separate from the internal parts of the receiver and so as to occupy very little space when lowered, whereas the dial drive proper is mounted inside the cabinet and only drives the dial pointer through a slot of the cabinet that may be readily formed so as to be inconspicuous. Due to the carriers arranged on both sides being very small compared with the glass dial the glass element preponderates absolutely in the structure so that a very nice construction is obtained.

According to the invention, the dial plate only serves as a carrier of the inscriptions and scale divisions and in some cases for conducting the totally-reflected luminous flux of the dial illuminating lamps. It is thus just here that without much discomfort the construction may be chosen so that the glass dial plate can be removed in a simple manner, for example after unscrewing some few binding screws, without the necessity for further receiver parts to be removed. This particularly simplifies the interchange of the dial, for example if changes are made in the wave-lengths of the transmitters.

If the carriers or bushes of the hinged dial are so constructed as to be able to accommodate the dial illuminating lamps the need for particular structural elements for housing the lamps is avoided. If the dial is mounted in bushes the lamps will preferably be arranged axially of the dial axis and so as to rotate with the dial so that the filament of the lamp will occupy the most favourable position relatively to the dial plate at all times.

In one convenient form of construction of the receiver according to the invention the pointer is rigidly mounted on the sliding piece of the dial drive but is provided with a hinge whose axis practically coincides with the axis of rotation of the hinged dial, the pointer being constructed to be so resilient as to be forced against the dial in any angular positions of the latter. This overcomes in a very practical manner the difficulty which resides in the fact that on the one hand the pointer is desired to be moved back and through a slot of the receiver cabinet which is as narrow as possible but on the other hand the indicating part of the pointer is desired to be moved closely along the dial in any angular position of the latter in order that parallax errors may be avoided as far as possible during reading. The pointer used in this case comprises a part which is always moved in the same position parallel along the guide and a part which thanks to the hinge in the axis of rotation of the dial is adapted accurately to follow any angular positions of the latter.

A further solution for the above problem of the invention is obtained by constructionally uniting the pointer and the pointer guide with the hinged dial so that they rotate with the latter and to provide the sliding piece driven by the dial drive with a catch which extends through the slot of the cabinet and moves the pointer with it in the direction of the dial axis but allows it to rotate about the dial spindle. In this case it is necessary to arrange a guide for the dial pointer at the back of the glass dial plate but this guide needs only to be formed by a small thin round metal rod which is little derogatory to the appearance of the glass dial and does not introduce any structural difficulty since it need not be arranged in the axis of the hinged dial, as was generally the case with the guides in the well-known hinged dial constructions. Complete separation between dial drive on the one hand and dial with pointer on the other hand is thus obtained so that the mounting is greatly facilitated.

It is in this case advantageous to fix to the pointer a flat flange normal to the dial axis which falls into a recess of the catch without any clearance. Thus a reliable drive in the axial direction is ensured at all times and the dial may be placed and removed without the necessity for a mechanical joint between catch and pointer to be detached.

In some cases it is advantageous to cause the pivots and bearings of the hinged dial to fall outside the profile of the receiver cabinet. In this construction, dial and supports are located on the cabinet as a separate construction which forms a single unit substantially of glass and affords great liberty to the designer of the receiver cabinet in regard to the choice of the shape of the cabinet since it is quite readily shaped similarly to very divergent forms of style.

It is, however, also possible to follow the reverse course and to cause the dial, and the pivots and bearings to remain within the profile of the receiver cabinet when the dial is swung backwards. This offers the advantage that the pivots and bearings practically disappear in the mass of the cabinet, it being only necessary that in between a depression should be recessed in the upper wall of the cabinet for accommodation of the glass dial plate. One advantage of this construction is constituted by the fact that the probability of damage of the dial during transport is considerably less than when the dial is located on top.

It is preferable that one or more indicators, for example for indicating the position of the wave band switch or of other control members, should be mounted in the receiver cabinet near the axis of the dial, the arrangement being such that the indicating member extends through the slot of the cabinet, is capable of moving parallel to the axis of rotation of the hinged dial and is adapted in any angular positions of the dial to co-operate with indications or signs placed on the dial edge. In this type of construction a relatively large portion of the pointer extends outside the confines of the receiver cabinet. The axis of the hinge of this pointer extending portion lies very close to the axis of rotation of the said tuning dial. As the lower edge of the dial plate is also situated very close to the axis of rotation of the said plate, it is obvious that the said lower edge of the plate will have a relatively small movement relative to the said pointer when both are rotated.

With receivers according to the invention comprising a dial structure placed outside on the cabinet it may be advantageous to provide one or more indicators, for example for indicating the position of the wave band switch, preferably rotary indicators, within or below the bearings and below the bushes of the hinged dial, it being possible to read them at that point through apertures or windows recessed in the receiver cabinet or bearings. This constitutes a structural simplification since the same part may be used both for journalling the dial carrier and for housing the indicators, the latter being moreover arranged in such manner on the top of the front side of the receiver as to be readily observed both when viewed in an approximately horizontal direction with right-up dial and when viewed in a steeply incident direction from above with the dial swung backwards.

In order that the invention may be clearly understood and readily carried into effect it will now be described more fully with reference to the accompanying drawing in which some embodiments are illustrated.

Figures 1, 2, 3:
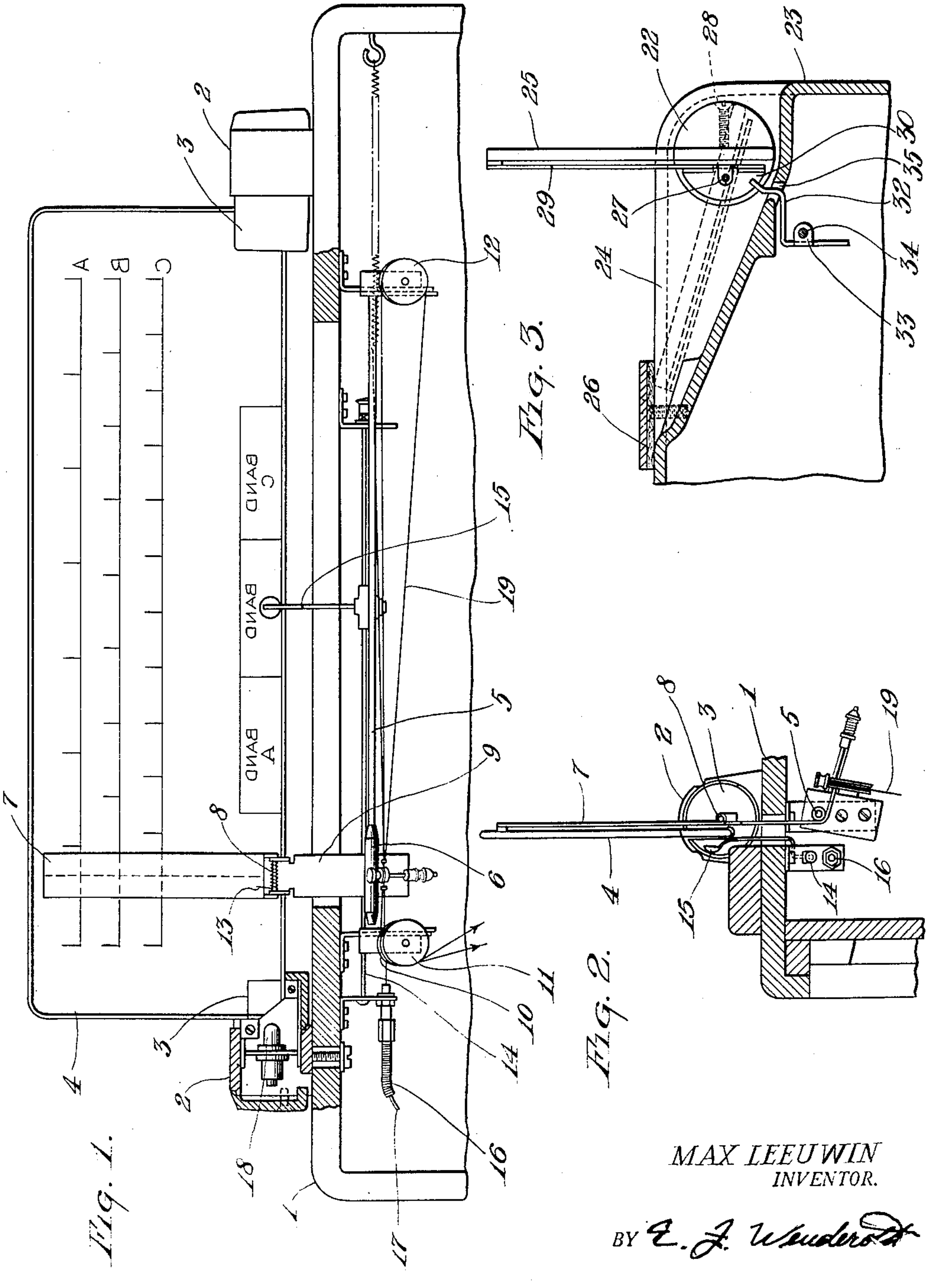
Figs. 1 and 2 are part-sectional views in rear and side-elevation of a portion of a receiver according to the invention.
Figs. 3 and 4 are also part-sectional views in rear and side elevation of a further construction according to the invention.
Figure 5:
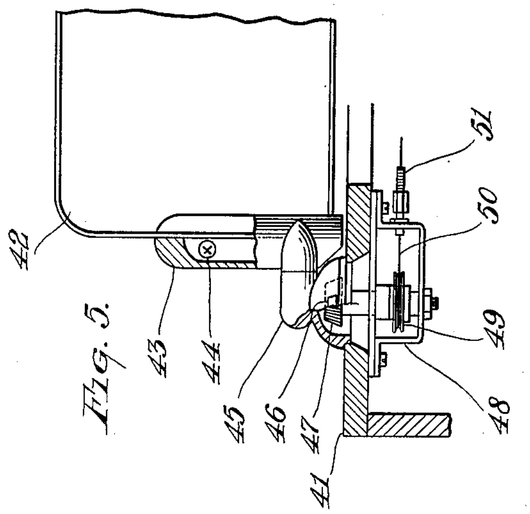
Figure 6:
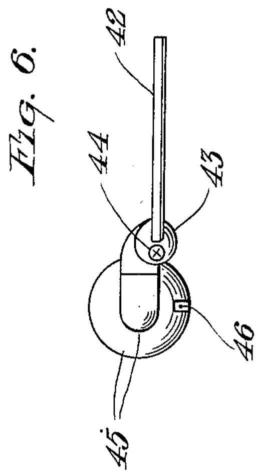

Figs. 5 and 6 are part-sectional detail views in front elevation and plan of a separate dial carrier having bearings and a rotary indicator according to the invention. Referring to Figs. 1 and 2, a receiver cabinet 1 comprises on both sides a bearing 2 of moulded insulating material enclosing a rotary dial carrier 3 also of insulating material, the glass dial plate 4 being secured in the said carrier so as to be integral therewith and to be adapted to rotate in the bearings 2 about a horizontal axis. The receiver cabinet encloses a guide rod 5 along which is adapted to move a sliding piece 6 to which a dial pointer 7 is secured by the intermediary of a hinge 8 and a rigid part 9. The rigid part 9 is also connected with a flexible driving rope 19 passing over rollers 10, 11 and 12 and driven from the drum of a tuning device not shown. A spring 13 ensures that the pointer 7 is kept forced against the dial plate 4 in any angular positions of the latter.

The cabinet also encloses a guide 14 on which is adapted to move an indicator 15 which can be operated by means of a Bowden cable 16 with pull wire 17 and which can co-operate for example with signs for the wave length bands on the lower edge of the dial plate 4.

In the axis of rotation of the hinged dial and within the bearings 2 and the dial carriers 3 are arranged on both sides small incandescent lamps 18 whose light is transmitted by total reflection in the glass plate and illuminates the inscriptions of the dial. This permits of choosing the position of the filaments of the lamps relatively to the dial plate so as to be as favourable as possible, this position being maintained in any angular positions of the dial.

Figure 4:
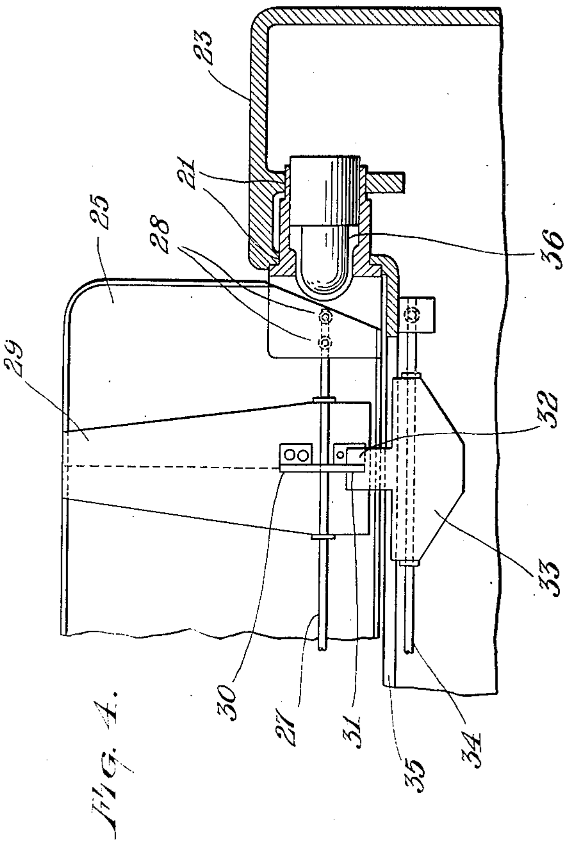

In the construction shown in Figs. 3 and 4 the bearings 21 for the dial carriers 22 are integral with the cabinet 23 which is made of moulded insulated material. A story 24 is recessed for the dial 25 and the dial carriers 22 so that when the dial is swung backwards they disappear within the profile of the cabinet where they can be steadied for transport by means of a clamping piece 26. The carriers 22 again contain dial illuminating lamps 35 which are concentric with the axis and can be quite readily interchanged from the interior of the receiver.

In this case, there is between the carriers 22 a guide rod 27 which constructionally is integral with the carriers 22 and the dial 25, the dial being secured in position in the carriers by means of binding screws 28 and being adapted to be readily removed after unscrewing of the said screws. The dial pointer 29 moves along the rod 27 but is not adapted to recede from the dial 25. The pointer comprises a flange 30 which is arranged normal to the guide rod 27 and fits exactly into the recess 31 of a catch 32 forming part of a sliding piece 33 which is arranged inside the cabinet and can be moved by the dial drive along the guide rod 34 and parallel to the external guide rod 27. The catch 32 is adapted to move in the slot 35 of the receiver cabinet and forms the single union between dial drive and pointer so that the parts of the dial drive arranged inside and those arranged outside the receiver cabinet are practically independent of each other.

Figs. 5 and 6 show a structural detail of a dial according to the invention mounted on top of the cabinet 41. The dial plate 42, only a small part of which is shown, is secured in a carrier 43 of moulded insulated material, which has arranged in it at the point diagrammatically shown at 44 a small incandescent lamp for the dial illumination whose leading-in wires (not shown) can be passed towards the interior of the receiver cabinet through hollow spaces of the carrier 43 and of the bearing 45. The bearing 45 has on its lower side the shape of a toad-stool arranged on top of the cabinet 41 and is provided with a window 46 through which can be seen one of the indications of the rotary indicator 47 which is rotatably mounted on the inside of the cabinet in a bearing strap 48 and may be connected to the control member concerned of the receiver by means of a pulley 49 and a Bowden drive 50, 51. Thus a very simple construction of small dimensions is obtained in which the bearing of the dial plate and the protection of dial illuminating lamps and indicator are assembled in a very small structure. From an aesthetic point of view this construction conforms particularly well to the simple hinged dial made substantially of glass according to the invention.

What I claim is:

1. Tuning apparatus for a cabinet type radio receiving set, comprising a pair of carrier members mounted in spaced apart relation on the top of the said set and provided with rotatable bushing portions, a transparent tuning indicating dial member mounted on the said bushing portions for a limited degree of rotary motion therewith about a horizontal axis, a guide member mounted within said cabinet parallel to the said axis in spaced relationship to said dial member, a pointer support member slideably mounted on said guide member, a flexible pointer member movable across the surface of said dial member and mounted on said support for movement therewith, and means for moving the said support member along the said guide member and thereby said pointer across the surface of said dial member.

2. Tuning apparatus for a cabinet type radio receiving set, comprising a pair of carrier members mounted in spaced apart relation on the top of the said set and respectively provided with spaced apart bushing portions in alignment and rotatable about a horizontal axis, a transparent plate-shaped tuning indicating dial mounted between said bushing portions for a limited degree of rotary motion therewith about the said axis, a rod-like guide member mounted within the cabinet of the said set and parallel to the said axis in spaced relationship to said dial, a pointer support member slideably mounted on said guide member, a flexible pointer member movable across the surface of said dial and rigidly mounted on said support, means to edgewise illuminate said dial comprising a lamp mounted within each of said bushing portions, and means for moving said support member along said guide member and thereby said pointer across the surface of said dial.

3. Tuning apparatus for a cabinet type radio receiving set, comprising a pair of carrier members mounted in spaced apart relation on the top of the said set and provided with rotatable bushing portions, a lamp mounted within each of said bushing portions, a transparent tuning indicating dial member mounted on said bushing portions for a limited degree of rotary motion about a horizontal axis, a rod-like guide member mounted within the said cabinet parallel to said axis in spaced relationship to said dial member, a pointer support member slideably mounted on said guide member, a hinged flexible pointer member movable across the surface of said dial member and rigidly mounted on said support, and belt-like means for moving said support member along the said guide member and thereby said pointer across the surface of said dial member, said dial member being illuminated by the light from said light sources.

4. Tuning apparatus for a cabinet type radio receiving set, comprising a pair of carrier members mounted in spaced apart relation on the cabinet of the said set and provided with rotatable bushing portions, a transparent rectangular-shaped tuning indicating dial member mounted between said bushing portions for a limited degree of rotary motion about a horizontal axis therewith, a rod-like guide member rigidly mounted within said cabinet parallel to the said axis in spaced relationship to said dial member, a pointer support member slideably mounted on said guide member, a flexible hinged pointer member movable across the surface of said dial member and mounted on said support and belt-like manually actuated means for moving the said support member along the said guide member and thereby said pointer across the surface of said dial member, and means to edgewise illuminate said dial member comprising lamp means positioned within said bushings.

5. Tuning apparatus for a cabinet type radio receiving set, comprising a pair of like carrier members mounted in spaced apart relation on the top of the cabinet portion of the said set and provided with rotatable bushing portions, a transparent rectangular-shaped tuning indicating dial member mounted edgewise between the said bushing portions for a limited degree of rotary motion about a horizontal axis therewith, a rod-like guide member mounted within the said cabinet parallel to the said axis in spaced relationship to said dial member, a pointer support member slideably mounted on said guide member, a hinged pointer member movable across the surface of said dial member and rigidly attached to the said support for movement therewith, said pointer being hinged approximately at the said axis so as to rotate with the said dial with minimum relative movements therewith, and means to edgewise illuminate said dial member comprising a lamp mounted within each of said bushing portions.

6. Tuning apparatus for cabinet type radio receiving set, comprising a pair of carrier members mounted in spaced apart relation on the top of said set and provided with rotatable bushing portions, a transparent tuning indicating dial member mounted between the said bushing portions for a limited degree of rotary motion therewith about a horizontal axis, a rod-like guide member mounted within said cabinet parallel to said axis, a pointer support member slideably mounted on the said guide member, a hinged flexible pointer mounted on the said support member and extending through a slotted opening in the said cabinet to a pressure contact relation with the said tuning dial member, belt-like means for moving the said support member and therethrough the said hinged flexible pointer member, and means to edgewise illuminate said dial member comprising lamp means positioned within said bushings, said pointer member being rotated with the said tuning dial member about its hinges.

MAX LEEUWIN.

REFERENCES CITED

The following references are of record in the file of this patent:

FOREIGN PATENTS

| Number | Country | Date |
|---|---|---|
| 43,791 | France | Aug. 30, 1934 |
| 428,461 | Great Britain | May 9, 1935 |